(12) United States Patent
Perlin et al.

(10) Patent No.: US 11,409,358 B2
(45) Date of Patent: Aug. 9, 2022

(54) SYSTEM AND METHOD FOR RECONSTRUCTING A VR AVATAR WITH FULL BODY POSE

(71) Applicants: Kenneth Perlin, New York, NY (US); Benjamin Ahibrand, Brooklyn, NY (US); Charles Hendee, Manteca, CA (US)

(72) Inventors: Kenneth Perlin, New York, NY (US); Benjamin Ahibrand, Brooklyn, NY (US); Charles Hendee, Manteca, CA (US)

(73) Assignees: New York University, New York, NY (US); Tactonic Technologies, LLC, New York, NY (US)

( * ) Notice: Subject to any disclaimer, the term of this patent is extended or adjusted under 35 U.S.C. 154(b) by 0 days.

(21) Appl. No.: 17/016,884

(22) Filed: Sep. 10, 2020

(65) Prior Publication Data

US 2021/0081031 A1 Mar. 18, 2021

Related U.S. Application Data

(60) Provisional application No. 62/899,493, filed on Sep. 12, 2019.

(51) Int. Cl.
*G06F 3/04845* (2022.01)
*G06F 3/0481* (2022.01)
(Continued)

(52) U.S. Cl.
CPC ............ *G06F 3/011* (2013.01); *G06F 3/0346* (2013.01); *G06F 3/0484* (2013.01);
(Continued)

(58) Field of Classification Search
None
See application file for complete search history.

(56) References Cited

U.S. PATENT DOCUMENTS 5,592,401 A * 1/1997 Kramer ............. A63B 69/3608
340/524
5,913,727 A * 6/1999 Ahdoot .................. A63F 13/28
463/39

(Continued)

OTHER PUBLICATIONS

E Whitmire, F Salemi Parizi, S Patel, Aura: Inside-out electromagnetic controller tracking, 2019 (Year: 2019).*

*Primary Examiner* — Jordany Nunez
(74) *Attorney, Agent, or Firm* — Ansel M. Schwartz

(57) ABSTRACT

A system for producing a shared virtual reality having a communication network. The system has a plurality of inside-out tracked HMDs that are worn by participants to view the shared virtual reality in communication with the network, right and left hand controllers that are held by the participant and right and left trackers that are worn on the ankles or feet of the participant. The system has a server computer in communication with the network which produces a full body pose of at least one of participant of the participants and transmits the full body pose via the network to all other participants HMD, so that each participant can see the full body pose in each participant's view into the shared virtual reality. A method for producing a shared virtual reality of participants.

4 Claims, 10 Drawing Sheets

(51) Int. Cl.
*G06F 3/01* (2006.01)
*G06F 3/14* (2006.01)
*G06F 3/0346* (2013.01)
*G06F 3/04817* (2022.01)
*G06F 3/0484* (2022.01)

(52) U.S. Cl.
CPC ...... *G06F 3/04817* (2013.01); *G06F 3/04845* (2013.01); *G06F 3/1454* (2013.01); *G06F 2203/04802* (2013.01)

(56) References Cited

U.S. PATENT DOCUMENTS

| | | | | |
|---|---|---|---|---|
| 5,930,741 A * | 7/1999 | Kramer | | G06F 3/011 |
| | | | | 702/153 |
| 6,148,280 A * | 11/2000 | Kramer | | A63B 69/3608 |
| | | | | 340/524 |
| 6,741,911 B2 * | 5/2004 | Simmons | | B25J 9/0006 |
| | | | | 318/568.11 |
| 7,542,040 B2 * | 6/2009 | Templeman | | G06T 13/40 |
| | | | | 345/474 |
| 8,868,373 B2 * | 10/2014 | Eng | | G06F 3/017 |
| | | | | 702/150 |
| 8,979,665 B1 * | 3/2015 | Najafi | | A63B 69/3608 |
| | | | | 473/269 |
| 9,067,097 B2 * | 6/2015 | Lane | | G06F 3/011 |
| 9,443,521 B1 * | 9/2016 | Olguin Olguin | | G10L 17/00 |
| 9,827,478 B1 * | 11/2017 | Najafi | | G09B 19/0038 |
| 10,761,618 B2 * | 9/2020 | Yildiz | | G06F 3/0354 |
| 11,052,288 B1 * | 7/2021 | Berme | | A63B 26/003 |
| 2003/0030397 A1 * | 2/2003 | Simmons | | B25J 9/0006 |
| | | | | 318/568.11 |
| 2003/0120183 A1 * | 6/2003 | Simmons | | G06F 3/011 |
| | | | | 600/595 |
| 2007/0003915 A1 * | 1/2007 | Templeman | | G06T 13/40 |
| | | | | 434/247 |
| 2011/0009241 A1 * | 1/2011 | Lane | | A63B 24/0087 |
| | | | | 482/8 |
| 2011/0202306 A1 * | 8/2011 | Eng | | A61F 4/00 |
| | | | | 702/150 |
| 2011/0306398 A1 * | 12/2011 | Boch | | A63F 13/5375 |
| | | | | 463/7 |
| 2012/0021833 A1 * | 1/2012 | Boch | | A63F 13/213 |
| | | | | 463/36 |
| 2012/0116548 A1 * | 5/2012 | Goree | | A61B 5/1123 |
| | | | | 700/90 |
| 2013/0278494 A1 * | 10/2013 | Huang | | G06F 3/048 |
| | | | | 345/156 |
| 2018/0196505 A1 * | 7/2018 | Nishizawa | | G06F 3/012 |
| 2018/0322681 A1 * | 11/2018 | Inomata | | A63F 13/211 |
| 2019/0354201 A1 * | 11/2019 | Rapoport | | G06F 3/017 |
| 2020/0004349 A1 * | 1/2020 | Yildiz | | G06F 3/0393 |
| 2020/0380784 A1 * | 12/2020 | Iyer | | G06T 7/277 |
| 2021/0149190 A1 * | 5/2021 | Johnson | | H04N 13/344 |
| 2021/0233304 A1 * | 7/2021 | Rowley | | H04N 5/2224 |

* cited by examiner

HMD AND HAND CONTROLLERS
UPPER BODY AVATARS

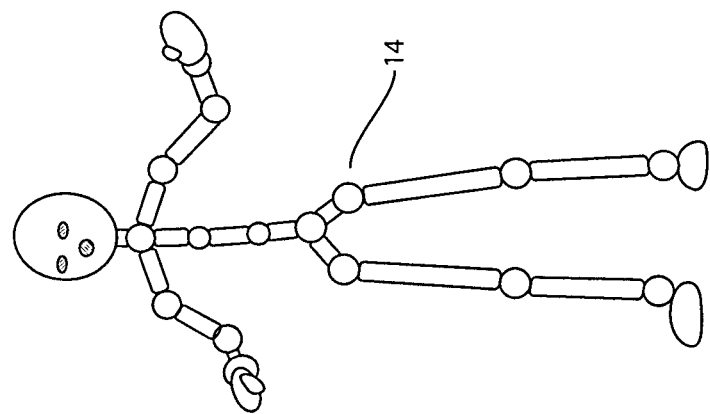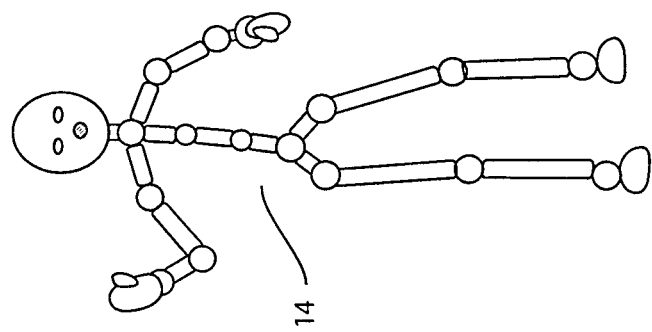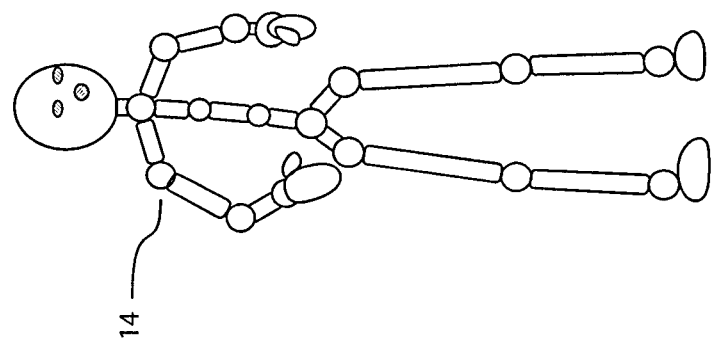
FIG 6

SYSTEM AND METHOD FOR RECONSTRUCTING A VR AVATAR WITH FULL BODY POSE

CROSS-REFERENCE TO RELATED APPLICATIONS

This is a non-provisional of U.S. provisional patent application Ser. No. 62/899,493 filed Sep. 12, 2019, incorporated by reference herein.

FIELD OF THE INVENTION

The present invention is related to reconstructing VR avatars with full body pose from inside-out tracked HMD. (As used herein, references to the "present invention" or "invention" relate to exemplary embodiments and not necessarily to every embodiment encompassed by the appended claims.) More specifically, the present invention is related to reconstructing VR avatars with full body pose from inside-out tracked HMD using hand controllers and foot or ankle trackers.

BACKGROUND OF THE INVENTION

This section is intended to introduce the reader to various aspects of the art that may be related to various aspects of the present invention. The following discussion is intended to provide information to facilitate a better understanding of the present invention. Accordingly, it should be understood that statements in the following discussion are to be read in this light, and not as admissions of prior art.

Using a Virtual Reality head mounted display (HMD) which is capable of inside-out tracking, such as the Oculus Quest, it is possible to accurately track six degrees of freedom (6DOF) for a user's head and also for each of two handheld controllers—specifically, the xyz position as well as the three axes of orientation for each of the head, the left hand and the right hand. Because the Quest uses inside-out tracking, it has the desirable quality that it requires no external markers or other optical apparatus in the surrounding space.

In a VR application shared by two or more users, it is desirable for each user to see all of the other users within the shared experience, represented as visible avatars. Ideally, the full body pose of the avatar of each user would be available, so that each user can see all of the other users as full body avatars. Yet because systems such as the Quest track only the head and hands, as shown in FIG. 1, only the upper body portion of a user's avatar can be reconstructed from data gathered by the Quest-like systems, as shown in FIG. 2. Therefore, multiple users sharing the same VR experience, whether in the same room or remotely located, are able to see only partial representations of each other, visible as avatars possessing only the upper half of their body.

RELATED PRIOR WORK

Prior work in the field has implemented foot position and orientation tracking by incorporating external optical equipment fixed to the room, such as the Kinect depth camera [MICROSOFT].

Other prior work uses a motion capture system such as OptiTrack or Vicon, which requires the user to wear retroreflective markers on the feet and/or ankles and employs many high-speed infrared cameras [FUTURE REALITY LAB].

In other systems, [Kruse, Lucie & Langbehn, Eike & Steinicke, Frank. (2018). I Can See on My Feet While Walking: Sensitivity to Translation Gains with Visible Feet. 10.1109/VR.2018.8446216; incorporated by reference, herein] the user straps a Lighthouse tracker to each ankle. The position and orientation of each of these trackers can be determined by time-varying structured light patterns impinging upon that tracker from a set of Lighthouse infrared beacons in the room.

All of the above systems are based on external optical line of sight between the user's feet and/or ankles and external optical components, and therefore suffer from the deficiency that multiple users can block each other's line of sight view of the external optical equipment. The greater the number of users, the more problematic that becomes.

Other prior work [TACTONIC] has affected foot position and orientation tracking by covering the floor with pressure imaging tiles. Again, this requires external equipment to be installed in the room.

Other prior work in the field [ANTILATENCY] has affected foot tracking by placing small cameras on each foot and placing structured lights into floor tiles. Again, this requires external equipment to be installed in the room. Also, the foot mounted cameras are quite expensive.

It would be possible for each user to wear a full motion capture suit based on IMUs, such as the Rokoko suit, which measures the joint angles of all of the major joints in the user's body. If combined with an inside-out tracking HMD such as the Oculus Quest, such a system would be able to infer the full body pose and the absolute position of each foot. However, this approach would require each user to wear a full body motion capture suit, which would be both prohibitively expensive and prohibitively cumbersome and intrusive for most applications.

BRIEF SUMMARY OF THE INVENTION

If additional tracking apparatus is worn on the user's feet or ankles, the additional information thereby provided can be used to reconstruct the appearance of an avatar of the user's entire body. It is advantageous to do this full body tracking using only inside-out tracking, in order to preserve the desirable property that no external markers or optical apparatus is needed in the surrounding space. Yet affordable inside-out methods for tracking the feet or ankles do not report absolute positions for the use's feet.

The present invention describes how to incorporate inexpensive inside-out methods of foot tracking to supplement inside-out tracked VR head and hands tracking, and then consequently to perform full body pose reconstruction, without the need for external markers or other optical apparatus.

The present invention pertains to a system for reconstructing a VR avatar with full body pose from a participant. The system comprises an inside-out tracked HMD that is to be worn by the participant. The system comprises a left-hand input device to either track or be held by a left hand of the participant that produces position data of the left hand of the participant. The system comprises a right-hand input device to either track or be held by the right hand of the participant that produces position data of the right hand of the participant. Hereafter, it is assumed input from the user's hands, be it camera based hand tracking (RGB or marker based IR), inside out tracked gloves via IMUs, neural interfaces, in the spirit of motion touch controllers/6dof remotes, or other method of gaining input from a users hands. Referred to hereafter as left/right hand controller. The system comprises a right tracker worn on a right foot or right ankle of the participant. The system comprises a left tracker worn on a left foot or left ankle of the participant. The system comprises a motion capture suit to be worn by the participant. The system comprises a motion capture unit which captures motion of the participant from the motion capture suit worn by the participant. The system comprises a communication network in communication with the left hand and the right hand and the right tracker and the left tracker and the motion capture suit and the motion capture unit. The system comprises a server computer in communication with the network that constructs a full body pose of the participant using real time data from only the right hand controller and left hand controller and right tracker and left tracker and HMD and from previously stored data from the motion capture unit.

The present invention pertains to a system for producing a shared virtual reality. The system comprises a communication network. The system comprises a plurality of HMDs that are worn by participants to view the shared virtual reality in communication with the network. The system comprises a computer server in communication with the network which produces a full body pose of at least one of participant of the participants and transmits the full body pose via the network to all other participants HMD, so that each participant can see the full body pose in each participant's view into the shared virtual reality. The server may produce the full body pose over time.

The present invention pertains to a method for producing a shared virtual reality. The method comprises the steps of producing with a computer server a full body pose of at least one of participant of a plurality of participants. There is the step of transmitting the full body pose via a communications network to an HMD worn by each of all other participants, so that each participant can see the full body pose in each participant's view into the shared virtual reality.

The present invention pertains to a method for producing a shared virtual reality of participants. The method comprises the steps of receiving a him and in t a server computer data from an inside-out tracked HMD worn on a head of a participant of the participants and two hand controllers held by the participant and trackers worn on feet or ankles of the participant. There is the step of constructing a full body pose of a participant using only the data from the HMD and the two hand controllers and the trackers. There is the step of displaying the full body pose of the participant in the shared virtual reality which is viewed by the HMD.

Given two or more participants, each wearing an HMD, the present invention pertains to a full body pose of any given participant being transmitted via wireless transmission to all other participants, so that each participant can see the full body pose of all other participants in their view into a shared virtual reality world of the HMD.

The present invention pertains to a method for reconstructing a VR avatar with full body pose from a participant. The method comprises the steps of sending timestamped data from an HMD on a head of a participant and a right-hand controller held by the participant's right hand and a left-hand controller held by the participant's left hand and feet trackers or ankle trackers on the participant's feet or ankles to a database on a server computer wirelessly. There is the step of applying mocap data in the database as labeling data by the server computer to map from input of the HMD, the right and left hand controllers and feet trackers or ankle trackers data to output of full body pose of the participant.

The present invention pertains to a method for producing a shared virtual reality of participants. The method comprises the steps of sending data from an HMD, hand controllers and feet or ankle trackers worn or held by each participant to a server computer. There is the step of reconstructing a full body pose for each participant from each participant's data with the server computer. There is the step of sending the full body pose of all participants wirelessly to all HMDs, so that each participant sees the full body pose of all participants in the shared VR displayed in each participant's HMD.

BRIEF DESCRIPTION OF THE SEVERAL VIEWS OF THE DRAWING

In the accompanying drawings, the preferred embodiment of the invention and preferred methods of practicing the invention are illustrated in which:

FIG. 6 shows multiple full body avatars.

DETAILED DESCRIPTION OF THE INVENTION

Figure 1:
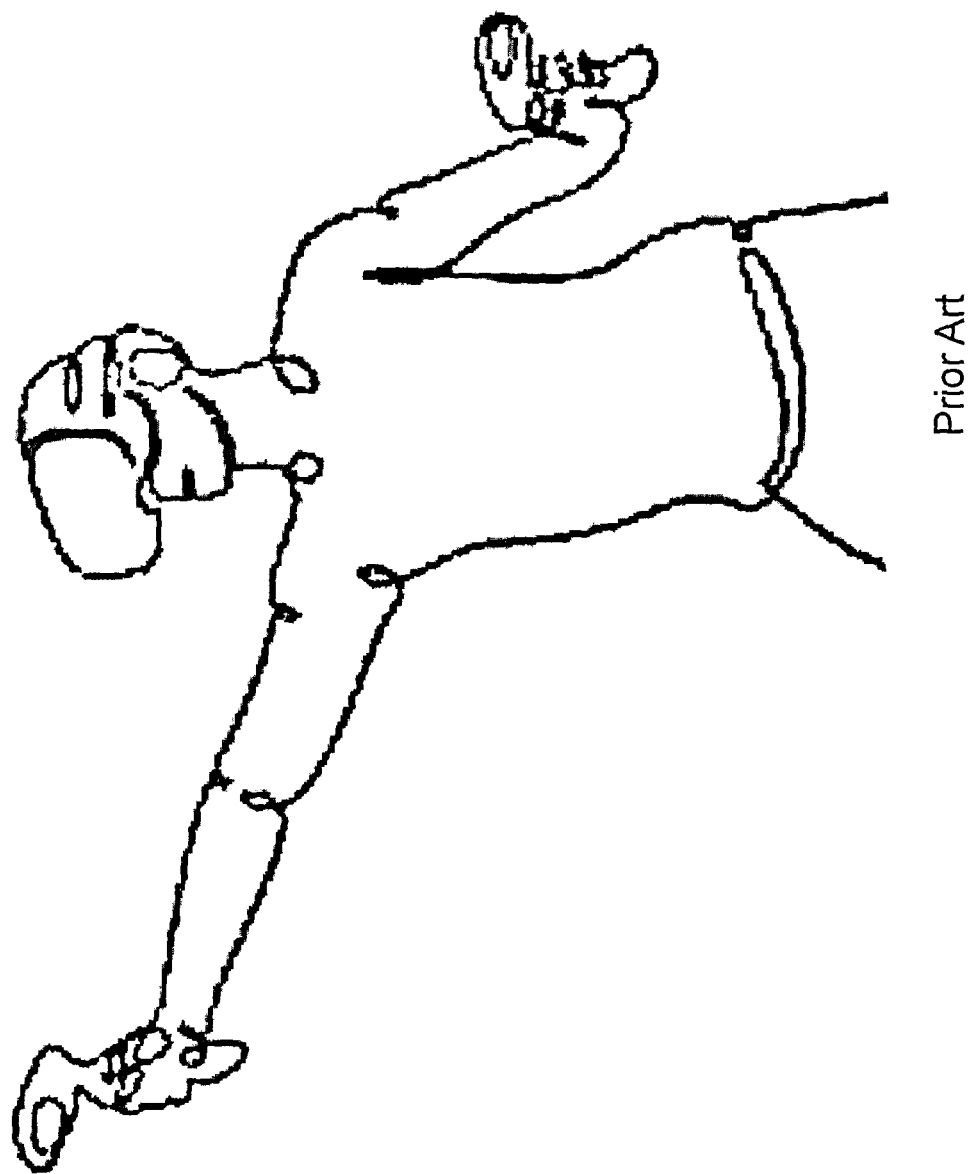
FIG. 1 shows a participant having an HMD and hand controllers.
Figure 2:
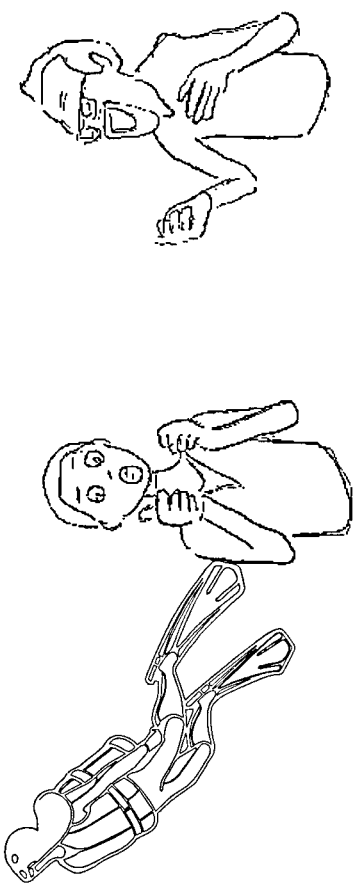
FIG. 2 shows upper body avatars in a virtual reality.
Figure 3:
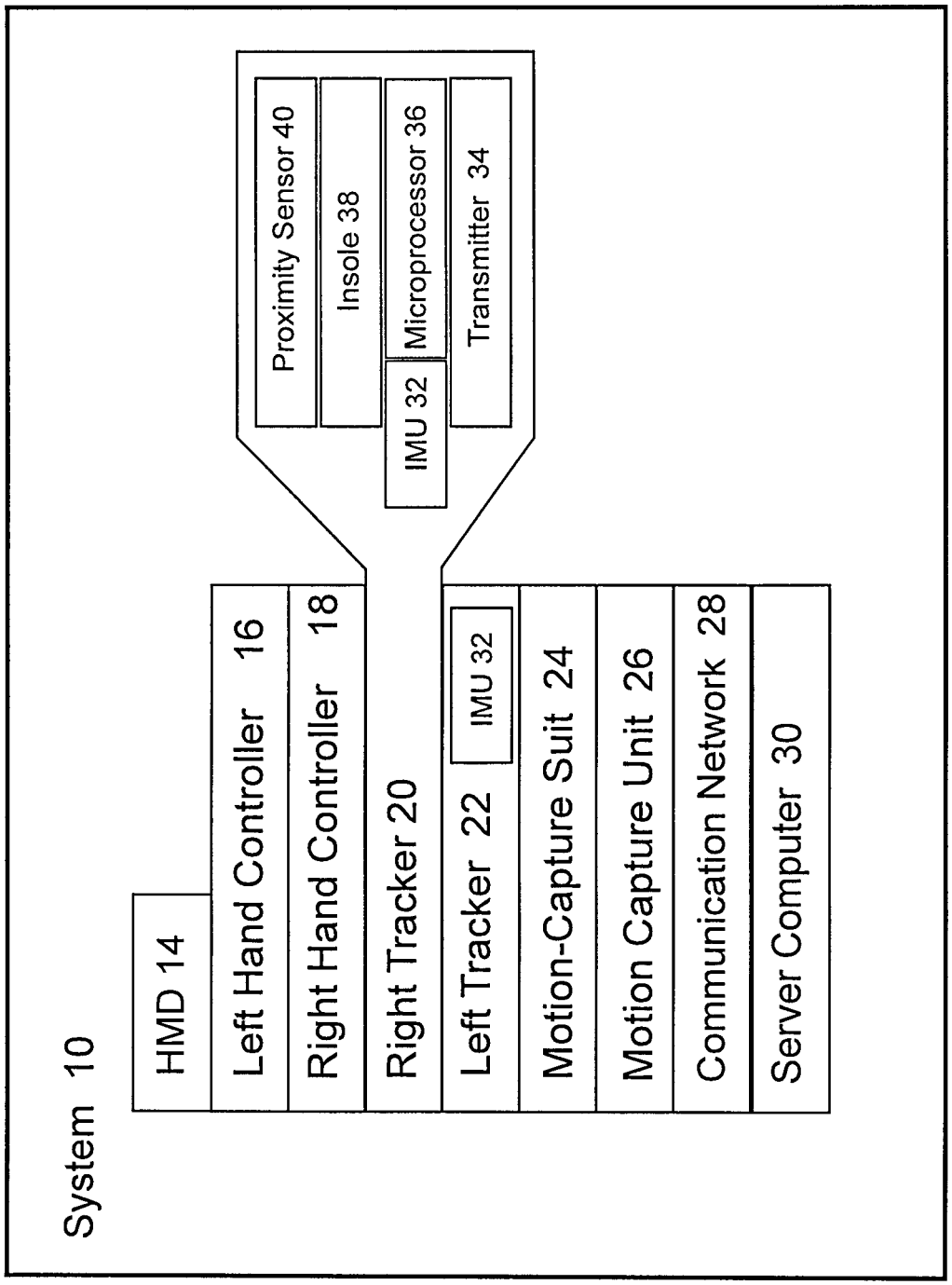
FIG. 3 is a schematic representation of the system of the claimed invention.

Referring now to the drawings wherein like reference numerals refer to similar or identical parts throughout the several views, and more specifically to FIG. 3 thereof, there is shown a system 10 for reconstructing a VR avatar with full body pose 12 from a participant. The system 10 comprises an inside-out tracked HMD 14 that is to be worn by the participant. The system 10 comprises a left-hand controller 16 to be held by a left hand of the participant that produces position data of the left hand of the participant. The system 10 comprises a right-hand controller 18 to be held by a right hand of the participant that produces position data of the right hand of the participant. The system 10 comprises a right tracker 20 worn on a right foot or right ankle of the participant. The system 10 comprises a left tracker 22 worn on a left foot or left ankle of the participant. The system 10 comprises a motion capture suit 24 to be worn by the participant. The system 10 comprises a motion capture unit 26 which captures motion of the participant from the motion capture suit 24 worn by the participant. The system 10 comprises a communication network 28 in communication with the left-hand controller 16 and the right-hand controller 18 and the right tracker 20 and the left tracker 22 and the motion capture suit 24 and the motion capture unit 26. The system 10 comprises a server computer 30 in communication with the network 28 that constructs a full body pose 12 of the participant using real time data from only the right hand controller 18 and left hand controller 16 and right tracker 20 and left tracker 22 and HMD 14 and from previously stored data from the motion capture unit 26. When the system 10 is used just for the end user, the motion capture suit 24 and unit 26 are not typically used. The server computer then already has access to data storage with details about each participants' full body which was previously collected by the unit 26. The motion capture suit 24 and unit 26 are only needed to create the data about a participant's appearance for storage and later use.

The right tracker 20 may have a 6° of freedom IMU 32 to produce tracked data from the right foot and a wireless transmitter 34 which transmits the tracked data to the server computer 30 through the communications network 28. The 6° of freedom are 3° of orientation and 3° of acceleration in an X, Y, Z coordinate system, and the left tracker 22 has an IMU 32. The right tracker 20 may have a microprocessor 36 in communication with the wireless transmitter 34 and the IMU 32. The microprocessor 36 processes the tracked data and sends the tracked data that has been processed to the server computer 30 through the wireless transmitter 34.

The right tracker 20 may have a foot pressure tracking insole 38 that is worn underneath the right foot. The foot pressure tracking insole 38 produces pressure data which is provided to the microprocessor 36, and the left tracker 22 has a foot pressure tracking insole 38 that is worn underneath the left foot. Each foot pressure tracking system produces six Center of Mass Values for convolutions; for example, each of the Phalange, Metatarsal (right and left sides of each foot), cuboid (splint into front and back), and the calcaneus. The right tracker 20 may include a proximity sensor 40 which measures time-varying distance between the right foot and a floor upon which the participant is walking.

The server computer 30 may receive input that includes position and orientation of each of the HMD 14, the left-hand controller and the right hand controller 18, gyroscopic orientation and accelerometer data from the IMU 32 of the right tracker 20 and left tracker 22, and six pressure values of the right foot and the left foot from the foot pressure tracking insole 38 of the right tracker 20 and the left tracker 22. The server computer 30 may receive a total number of input scalar values of 42, where six scalar values are for the position and orientation of the HMD 14 and for each of the right hand controller 18 and the left hand controller 16, six from each of the IMU 32 of the right tracker 20 and left tracker 22, and six for each of the foot pressure tracking insole 38 of the right tracker 20 and the left tracker 22, the server computer 30 produces a body pose 12 output of the participant from the 42 input scalar values.

The server computer 30 may produce a total number of 48 output scalar values, where six scalar values for the position and orientation of each of the head, hands, feet, upper torso and pelvis, +2 scalar values for each of a right shoulder and left shoulder, +1 scalar value for each of the right elbow, left elbow, right knee and left knee of the participant. The computer produces a body pose 12 output of the participant from the 48 scalar values. The body pose 12 output of the participant may include position and orientation of the right-hand and left-hand, right foot and left foot, upper torso, pelvis, head, forward and upward rotation of each shoulder about the upper torso and inward to outward turning of elbows and knees of the participant. Preferably, there are no external markers or other optical apparatus about any participant in a surrounding space that is used by any participant for the VR where the full body pose 12 of each participant is displayed, or no external markers or other optical apparatus are used to produce a full body pose 12 of each participant in the VR.

The present invention pertains to a system 10 for producing a shared virtual reality. The system 10 comprises a communication network. The system 10 comprises a plurality of HMDs that are worn by participants to view the shared virtual reality in communication with the network. The system 10 comprises a computer server in communication with the network which produces a full body pose 12 of at least one of participant of the participants and transmits the full body pose 12 via the network to all other participants HMD 14, so that each participant can see the full body pose 12 in each participant's view into the shared virtual reality. The server may produce the full body pose 12 over time.

The present invention pertains to a method for producing a shared virtual reality. The method comprises the steps of producing with a computer server a full body pose 12 of at least one of participant of a plurality of participants. There is the step of transmitting the full body pose 12 via a communications network to an HMD 14 worn by each of all other participants, so that each participant can see the full body pose 12 in each participant's view into the shared virtual reality.

The present invention pertains to a method for producing a shared virtual reality of participants. The method comprises the steps of receiving server computer 30 data from an inside-out tracked HMD 14 worn on a head of a participant of the participants and two hand controllers held by the participant and trackers worn on feet or ankles of the participant. There is the step of constructing a full body pose 12 of a participant using only the data from the HMD 14 and the two hand controllers and the trackers. There is the step of displaying the full body pose 12 of the participant in the shared virtual reality which is viewed by the HMD 14.

Given two or more participants, each wearing an HMD 14, the present invention pertains to a full body pose 12 of any given participant being transmitted via wireless transmission to all other participants, so that each participant can see the full body pose 12 of all other participants in their view into a shared virtual reality world of the HMD 14.

The present invention pertains to a method for reconstructing a VR avatar with full body pose 12 from a participant. The method comprises the steps of sending timestamped data from an HMD 14 on a head of a participant and a right hand controller 18 held by the participant's right hand and a left hand controller 16 held by the participant's left hand and feet trackers or ankle trackers on the participant's feet or ankles to a database on a server computer 30 wirelessly. There is the step of applying mocap data in the database as labeling data by the server computer 30 to map from input of the HMD 14, the right and left hand controllers and feet trackers or ankle trackers data to output of full body pose 12 of the participant.

The present invention pertains to a method for producing a shared virtual reality of participants. The method comprises the steps of sending data from an HMD 14, hand controllers and feet or ankle trackers worn or held by each participant to a server computer. There is the step of reconstructing a full body pose 12 for each participant from each participant's data with the server computer. There is the step of sending the full body pose 12 of all participants wirelessly to all HMDs, so that each participant sees the full body pose 12 of all participants in the shared VR displayed in each participant's HMD 14.

Figure 4:
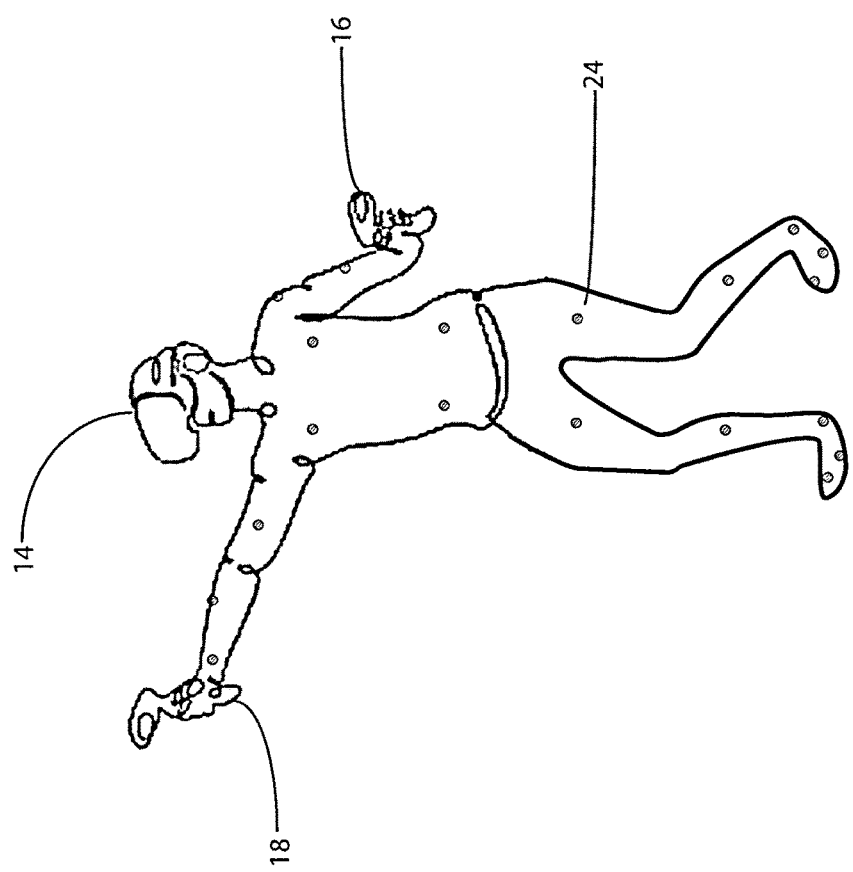
FIG. 4 shows a participant in the training phase.

In the operation of the invention, to generate the full body pose 12 from the aforementioned sensor data, the present invention employs machine learning (ML), trained on a ground truth reference system 10 that can track the full body pose 12 of exemplar users, such as an OptiTrack full-body optical tracking system 10. The method contains two phases: Phase (1) is a training phase, in which an operator uses a full body ground truth motion capture system 10 while wearing a motion capture suit 24, while also wearing an inside-out tracked HMD 14, holding two VR hand controllers, and employing tracking apparatus for either the feet or ankles, as shown in FIG. 4. In this first phase, the ground truth full body pose 12 from the reference system is used as a label set to train the ML system that will produce full body pose 12 as output in response to the data from the HMD 14, hand controllers and feet or ankles trackers. Phase (2) is a run-time phase experienced by end users, in which only an HMD 14, hand controllers and inexpensive feet trackers are required. The ML algorithm uses only this run-time data to reconstruct a full body pose 12 for each user. This technique assumes input from the user's hands, be it camera based hand tracking (RGB or marker based IR), inside out tracked gloves via IMUs, neural interfaces, in the spirit of motion touch controllers/6dof remotes, or other method of gaining input from a user's hands. Referred to hereafter as left/right hand input interface.

Figure 5:
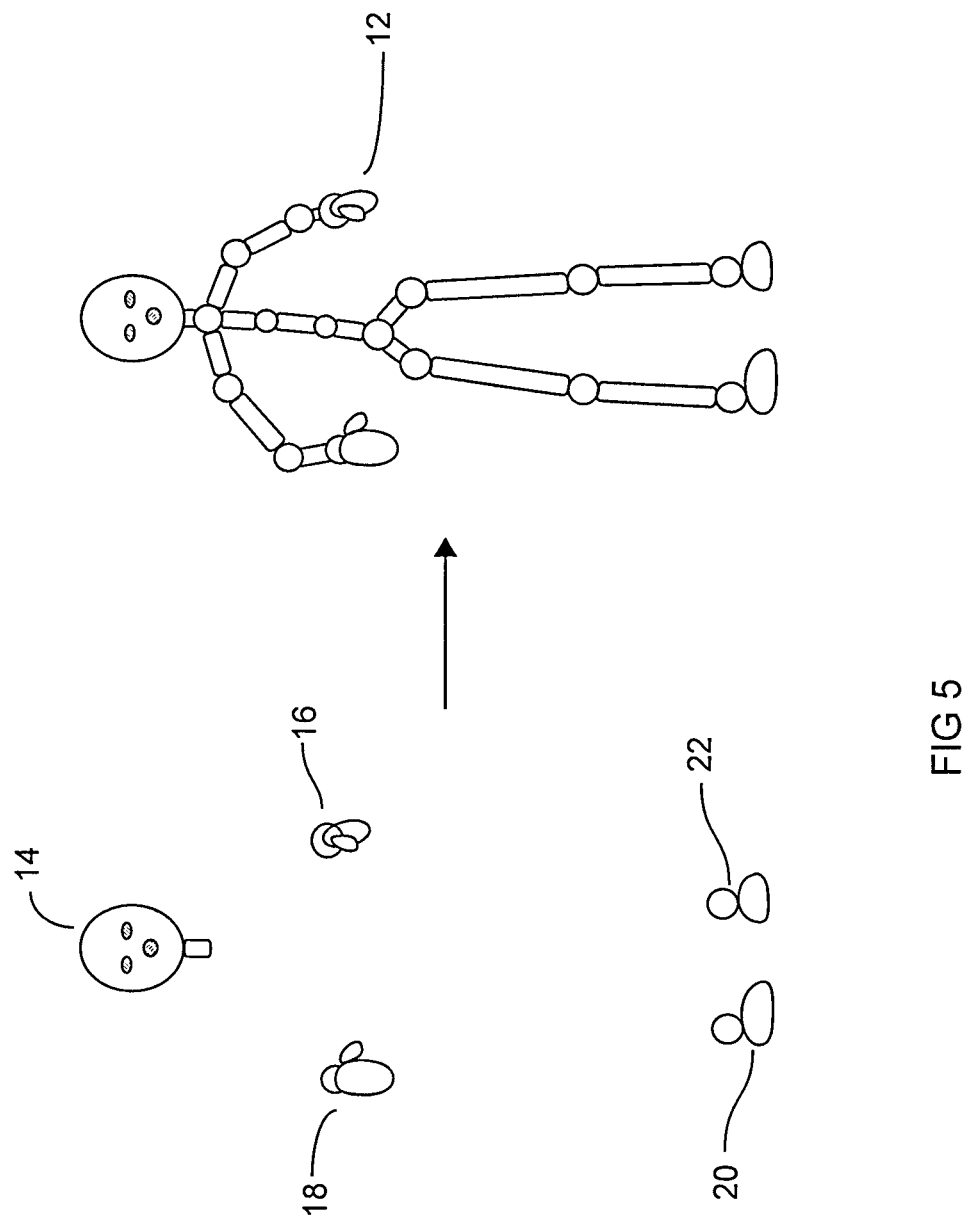
FIG. 5 is a representation showing sensors of a participant used to create a full body pose.

FIG. 5 illustrates the essential run-time process, which is a conversion of a small number of runtime sensors into complete position and orientation values for the joints of the body required to construct a full body avatar, referred to herein as the body pose 12.

The computation to convert from sensor data to body pose 12 can be done on a server computer 30 which can be wirelessly connected to the HMD 14 and foot trackers, such as by Wi-Fi, Bluetooth, other wireless communication technology, or a combination of these; or the server computer 30 may be located in the HMD 14 itself where one of the HMDs 14 worn by two or more participants is designated as the server computer and interacts with the other HMDs as a remote computer 30 would. The server then can wirelessly transmit the full reconstructed body pose 12 of every user to the HMDs of all users. This enables all users, whether in the same physical location or remotely located, to see each other within the shared virtual experience as full body avatars, as in FIG. 6.

Conversion From Sensor Data to Body Pose

In one embodiment, the sensor input may consist of the position and orientation of each of the HMD 14, the left hand controller 16 and the right hand controller 18, as well as gyroscopic orientation and accelerometer data from the IMU 32 for each foot, as well as six pressure values for each foot derived by applying weighted area convolutions to the pressure image for that foot from a pressure imaging sensor, as described in U.S. patent application Ser. No. 16/514,597, incorporated by reference herein.

The total number of input scalar values in this embodiment is 42: six for the position and orientation of the HMD 14 and each of the two hand controllers, plus six for the data from each of the two IMUs, plus six for each of the two foot pressure images after convolution has been applied.

Also in this embodiment, the body pose 12 output may consist of position and orientation of the head, hands, feet, upper torso and pelvis, together with the forward and upward rotation of each shoulder about the upper torso, together with the inward to outward turning of the elbows and knees.

The total number of output scalar values in this embodiment is 48: six for the position and orientation of each of the head, hands, feet, upper torso and pelvis, plus two for each of the shoulders, plus one each for the elbows and knees.

Figure 7:
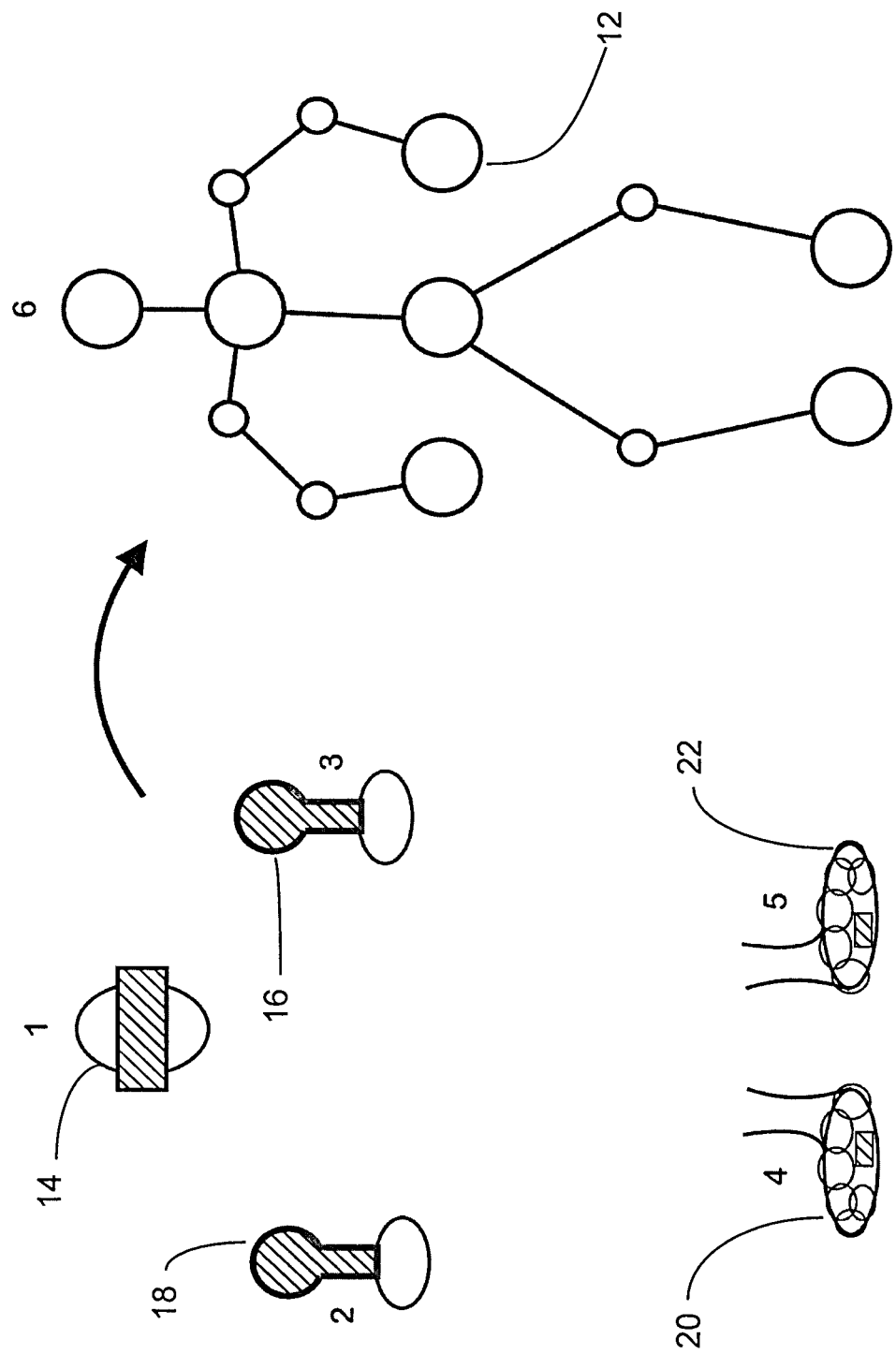
FIG. 7 is a schematic representation of the sensors being used to produce the full body pose.

FIG. 7 illustrates the mapping from (1) HMD 14, (2) left hand controller 16, (3) right hand controller 18, (4) IMU 32 and convolution-reduced pressure image data for the left foot, and (5) IMU 32 and convolution-reduced pressure image data for the right foot to (6) the output body pose 12.

In the described embodiment, as the operator moves around while wearing both the input sensors and the full motion capture suit 24, at each time-step the operator generates both 42 scalar input values (from the input sensors) and 48 body pose 12 values (from the motion capture system). In this way, a very large number of specific examples of a mapping from 42 input values to 48 output values can be accumulated. These can be thought of as "labeled" examples, since each output is being labeled with a corresponding input.

Given a new set of 42 input values X, a corresponding set of 48 output values is computed as follows: For each of the accumulated example mappings [Xi->Yi] from input values to output values, the magnitude of the vector distance between X and Xi is computed. The larger this difference, the less weight we give to output Yi in a weighted sum that creates a best mapping to a final output Y.

For example:

```
SumW = 0
SumY = 0
For each mapping [Xi -> Yi]
Begin
    W = (1 + | X ~ Xi | / | X |) −2
    SumW += W
    SumY += W * Yi
End
Y = SumY / SumW
```

Them may also be many examples of output poses, gathered from databases of human movement. Each such example will contain the 48 output values, but not the 42 input values. These can be thought of as "unlabeled" examples, since each output is not labeled by a corresponding input.

These unlabeled examples can collectively be used to improve the quality of the final output, so that any given output is modified to better align with nearby unlabeled body poses. After running the above procedure, all of these unlabeled examples are looped over. For each unlabeled example output Yi, its vector distance is measured to the prior result Y. The smaller the distance from Yi to Y, the more some of Yi is mixed into Y.

For example:

```
For each unlabled Yi
Begin
    t = (1 + C * | Y − Yi | / | Y |) −2
    Y = (1−t) * Y + t * Yi
End
```

A reasonable value for C in the above procedure is ½. Larger values of C can be used to decrease the influence of each example output Yi on the final output, and smaller values of C can be used to increase the influence of each example Yi output on the final output.

Using an ML Algorithm to Increase Conversion Efficiency

Summary:

The aforementioned conversion can be made much more efficient by using ML to split the computation into two phases: (1) A training phase, which uses data from many sensor data values to construct an efficient representation of the mapping from sensor data values to corresponding body pose 12 values, and then (2) a runtime phase, in which the constructed representation of the mapping is used to efficiently convert new sensor data values to corresponding body pose 12 values.

ML is employed in order to learn a mapping from an HMD 14 and two controllers, as well as an IMU 32 and possibly a pressure imaging device and/or proximity sensors 40 placed on the feet or ankles.

The output can vary from, at a minimum, only head, hands and feet positions and orientations to a sparse or, at a maximum, full skeleton reconstruction, depending on the dataset and runtime needs. Semi-supervised learning is used in the form of regression prediction models via variational autoencoders (VAE), which in one embodiment can be adversarial, in order to learn an unknown (latent) manifold of human poses.

Regression, in its simplest form, is a curve that best fits a given function. In this case, instead of a line or k degree polynomial, the neural net approximates the function by adjusting weights. The classic case of using neural networks for classification, is where lines of separability are drawn between clusters of classes, but here, for 3D joint predictions, the result is not classification, but the output of positions in 3D space, thus the last classification step is removed.

What is a VAE, and why use it? An autoencoder simply learns an encoding (a latent code) from a set of inputs, and simultaneously learns a decoding to recover the expected output from the code. This code can be overcomplete or undercomplete. Undercomplete is the case where the latent code contains insufficient information to properly map the encoded input to the decoded output. Overcomplete is the opposite case, where the latent code contains more information than is necessary to properly map the encoded input to the decoded output. The layer of the latent code is commonly referred to as a bottleneck layer, where the notion is to force the network to learn only the most salient or useful pieces of the data distribution, ignoring signal noise.

A VAE includes the above, but also imposes some mathematical structure on the model. The means by which VAEs typically achieve this, is by something known to the ML community as reparameterization. To reparameterize, the parameters of the latent distribution am optimized by sampling from a normal distribution, and shifting the sample by the mean, and scaling by the standard deviation of the latent distribution. The result is a vast reduction in the noise introduced to the output signal.

VAE and regression are combined by constructing the autoencoder, consisting of N layers with strided residual skip connections between each layer, for both the encoder and decoder, coupled via a bottleneck layer for the latent code, and finally decoding to N joints. In this case, the decoding to N joints is the regression.

Semi-supervised learning is typically where there is a small amount of labelled data (supervised), and a large amount of unlabeled data (unsupervised). In the particular case of the present invention, the labelled data is the combined operator-captured input from OptiTrack, Rokoko, shoes, HMD 14 + controllers. There is also a rich source of data available online, however, labels for that on-line data are not available. Because the learning algorithm used hem is a combination of these labelled data (supervised) and unlabeled data (unsupervised), it is a semi-supervised learning algorithm.

This semi-supervision takes the form of feeding the unlabeled data in intermittently and performing a reconstruction on the input, that is—have the network reconstruct the input given, and the use of reconstruction loss refers minimizing the mean-squared error between the source and generated output.

Either a single frame of data to recover a skeleton is passed in or a sliding window for a temporally smoothed version of the input is maintained. If a sliding window is maintained, then in one embodiment, three frames would provide acceleration aware prediction, accomplished by adding an additional dimension to the network layers.

The idea of a sliding window of multiple frames described above, is essentially that by looking at neighboring frames, a finite difference is computed in order to approximate the derivative of the function with respect to time. So instead of having just a set of values, there is a set of values and also their derivatives, and possibly second derivatives as well, with respect to time. Known from elementary mechanics, where the first derivative of position is velocity, and the second derivative is acceleration. Thus, an additional dimension to the network layers serves to account for this, since automatic differentiation [see Automatic differentiation in PyTorch, Adam Paszke, Sam Gross, Soumith Chintala, Gregory Chanan, Edward Yang, Zachary DeVito, Zeming Lin, Alban Desmaison, Luca Antiga, Adam Lere28 Oct. 2017 (modified: 28 Oct. 2017) NIPS 2017 Workshop Autodiff Submission, incorporated by reference, herein, for additional information] is a fundamental property that is useful in deep learning frameworks in order to leverage backpropagation [LECUN].

The dataset used for training includes the following sources:

HMD 14/controllers

IMU-sensor based Mocap such as Rokoko provides body pose ground truth data

Optical marker based Mocap such as OptiTrack provides body pose ground truth data Foot tracking via IMU 32 optionally with pressure sensor and/or downward facing proximity sensor 40

Common 3D pose datasets, such as Human 3.6 m which are general and publicly available and wouldn't apply to every layer of the network, but the middle layers of the network of can be frozen and a reconstruction loss can be performed to see whether the model is capable of reconstructing itself and giving it a large source of unlabeled data to help the model generalize onto the pose manifold The ML Training Stage:

For k epochs, where k is typically defined to be in the range of 100 to 200:

Given some batched input, where input is:

a. Pos{x,y,z}/Orientation {phi theta rho} for HMD 14, right controller, left controller b. IMU 32 {pitch, roll, yaw}+acceleration {x,y,z} c. Optional foot pressure and/or proximity values

Feed input to model described above in step 1, obtain output in the form of N target joints (Optional) IK to impose realistic joint and limb constraints in order to scaffold the model Compute loss by comparing mean per joint position error (MPJPE) between source and ground truth for some constant number of iterations:

d. Feed the network raw input, in order to generate a reconstruction of itself e. minimize the mean-squared error between the source and generated output Perform back-propagation The ML Inference/Run-Time Stage:
1. Provided time synced network stream of a sliding window for HMD 14+controllers+IMU 32+optional pressure and/or proximity data
2. Run input stream through the model
3. Recover outputs and send to client via wifi
4. use algorithm (optional) in corresponding training step 3
5. Recover 3D pose At run-time, after the ML inference has been completed:

During the run-time, after the 3D pose has been recovered for all users, then the 3D pose for all users is transmitted wirelessly from the server computer 30 to the HMDs of all users, where the pose data is then used to construct, for each user, 3D computer animated representations of the avatars of all users.

Description of the Feet or Ankles Trackers

For each of the user's two feet, a foot or ankle tracker is provided.

Each foot or ankle tracker contains a 6DOF IMU 32 (three degrees of orientation as well as acceleration in x,y,z) and a Bluetooth or Wifi wireless transmitter, together with a microprocessor 36 to process the tracked data and send it to a server computer 30 via the wireless transmitter, as well as an electric battery or equivalent to power the foregoing.

Figure 8:
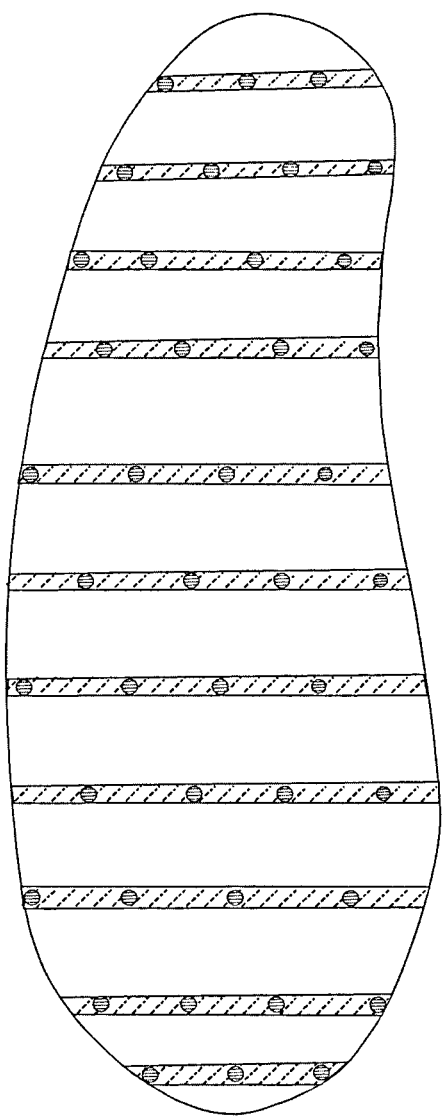
FIG. 8 is a pressure image of a foot pressure tracking insole.

Each foot or ankle tracker may also optionally contain a foot pressure tracking insole 38 as described in U.S. patent application Ser. No. 16/514,597, which generates a pressure image, as shown in FIG. 8. If this component is included, then the tracker is worn underneath each foot. The inclusion of this component allows the inference of the position of untracked body parts, such as the participant's waist, with a fidelity that would not be possible by tracking only the position and orientation of each foot. For example, if the pressure on either the left or right foot is mainly on the front of that foot, this indicates that the participant's weight is thrust forward in anticipation of walking forward, and therefore it can be inferred that the participant's waist is positioned more forward than the participant's head. Furthermore, if at the same time the other foot has pressure mainly on the rear of the foot, this would indicate the participant is walking and position the waist and knees and thighs and calves of each leg in the appropriate position for walking. Similarly, if there is no pressure anywhere on the other foot, this indicates also the participant is walking and adjust the waist and knees and thighs and calves are in mid-stride and position them accordingly to show the full body pose in mid-stride with the leg having no pressure on its insole being slightly bent and lifted off the ground being positioned to about to receive the weight of the participant as the participant's weight shifts while walking forward. All of this full body pose configuration would be further confirmed by reviewing the next few milliseconds of data to show the pressure changes on the two insoles are changing to correspond to what would be expected from pressure changes from walking, for instance, from data developed during the training phrase when the participant was wearing the motion capture suit and doing various movements including walking. Cases where neither foot is on the ground are examples of the power of combining the various sensing modalities of the foot tracking elements—the foot/ankle tracker's IMU data can be used in conjunction with the pressure data (or lack thereof) to determine user poses in situations such as if the user is jumping or running by the direction of the accelerometer directions. Again, body pose configuration would be confirmed by reviewing the previous and next few milliseconds of data from how the foot or feet left the ground to how the foot/ankle tracking accelerometer data changes and changes. If this component is included, then the tracker is worn underneath each foot.

Figure 9:
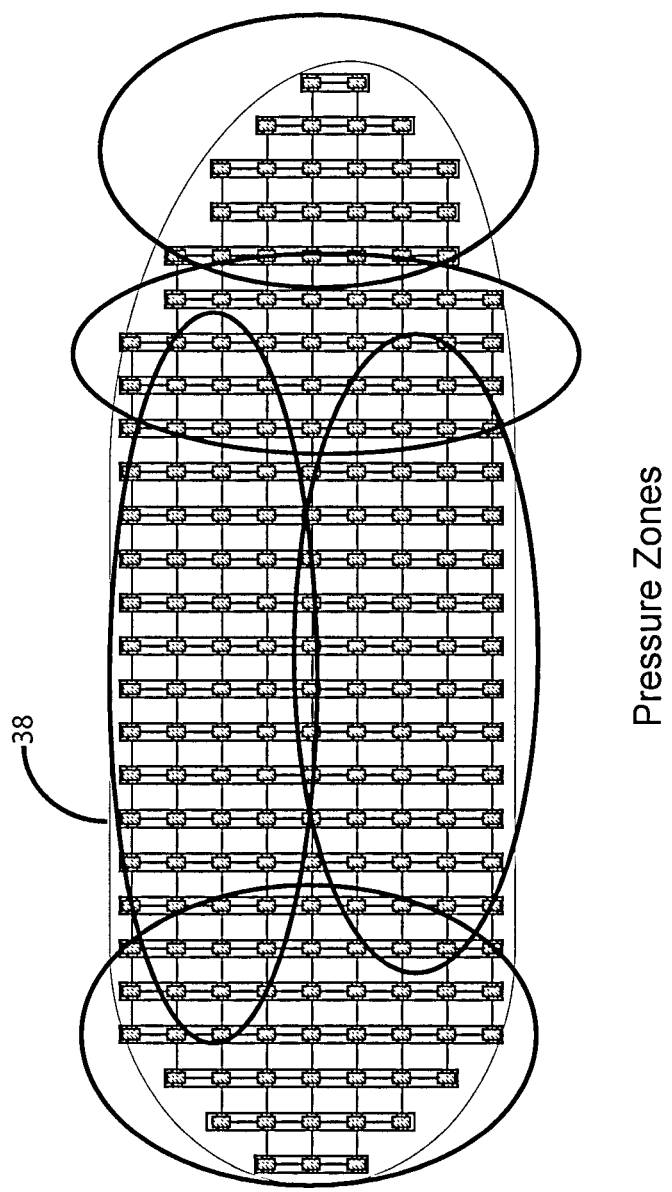
FIG. 9 shows pressure zones associated with the pressure image of FIG. 8.

In order reduce both the bandwidth of Bluetooth communication and the dimensionality (and therefore the runtime cost) of the ML computation, the microprocessor 36 can optionally perform convolutions on zones of the sensor image before transmission, as described in U.S. patent application Ser. No. 16/514,597, U.S. patent application Ser. No. 16/514,597 and shown in FIG. 9. This step can reduce the size of the data from on the order of 100-200 values to on the order of 5-10 values.

Alternatively, the tracker can be contained within a strap worn about the user's ankle.

Figure 10:
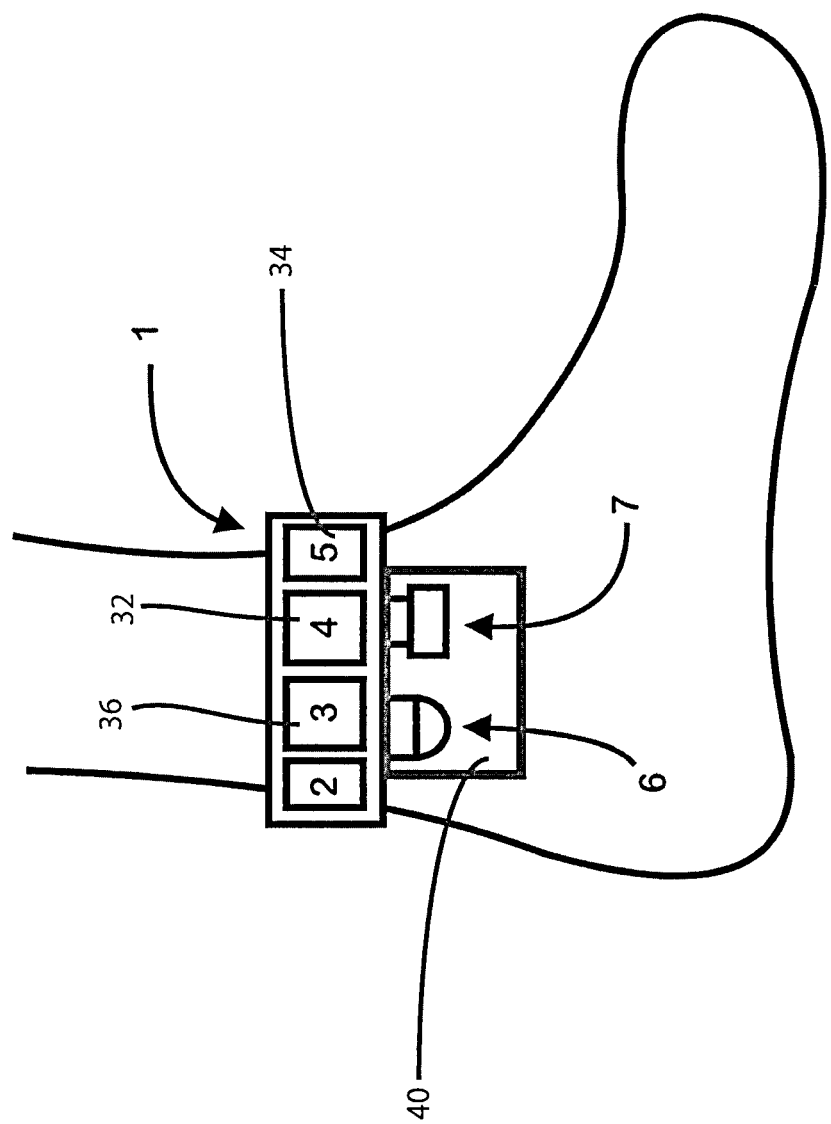
FIG. 10 is a schematic representation of a foot tracker.

Each foot or ankle tracker may also optionally contain an IR proximity sensor 40, a technology which is standard in the art, aiming downward so as to measure time-varying distance to the floor for that foot, as shown in FIG. 10. In this embodiment, the tracker consists of a strap (1), on which are mounted a battery (2), microprocessor 36 (3), IMU 32 (4) and Bluetooth transmitter 34 (5). Optionally the tracker may also contain a proximity sensor 40 to measure time-varying distance to the floor, which consists of an infrared LED (6) and an infrared sensor (7). The data from the IMU 32 and the optional infrared sensor are sent to the microprocessor 36, which then transmits the data to the server computer 30 via Bluetooth.

Inventory of Parts
1. HMD 14
2. Two VR controllers
3. Two feet or ankle trackers
4. Motion capture suit 24
5. Optical motion capture system
6. Server computer
7. Wi-Fi router
8. Bluetooth transceiver Step by Step Operation by User
1. Each user puts on feet or ankles trackers.
2. Each user launches VR app, puts on HMD 14 and picks up the two controllers.
3. Users walk around, seeing each other as full body avatars in a shared virtual world.

Step by Step Internal Operation in Best Embodiment

At ML (ML) Training Time:
1. Operator turns on mocap system and launches mocap program on server computer.
2. Operator puts on motion capture suit 24.
3. Operator puts on feet or ankles trackers.
4. Operator launches VR app, puts on HMD 14 and picks up the two controllers.
5. Operator walks around, performing a series of typical human movements.
6. During step 5, mocap program on server computer 30 analyzes optical data from motion capture suit 24 and saves time stamped full body pose 12 data to a database.
7. During step 5, timestamped data from HMD 14 and two controllers is sent to the database on the server computer 30 wirelessly via Wi-Fi.
8. During step 5, timestamped data from feet or ankle trackers is sent to the database on the server computer 30 wirelessly via Wi-Fi or Bluetooth.
9. Time synchronized information from mocap, HMD 14, hand controllers and feet or ankle trackers is now stored in a database on the server computer.

10. ML (ML) training algorithm is applied, using mocap (motion capture) data in database as labeling data to train on mapping from input of HMD 14, hand controllers and feet or ankle trackers data to output of full body pose 12.

At Run Time:

1. Data from HMD 14, hand controllers and feet or ankle trackers is sent from each user to server computer, which runs trained ML neural-net for that user to reconstruct full body pose 12 of that user.
2. Full body pose 12 of all users is sent wirelessly to all HMDs, so that the VR app running in each user's HMD 14 sees the full body pose 12 of all users.

Example Uses of Invention

Entertainment Use:

A multi-participant immersive fantasy world, such as a re-creation of walking around in the Lord of the Rings universe. Each user can choose to appear as a different creature in this fictional universe, such as a Hobbit or an Elf or an Orc. A participant choosing to appear, for example, as a Hobbit, will have a head to foot appearance of a Hobbit to all other participants in the experience.

Educational Use:

A teacher is explaining physics to a group of students. Using shared VR, all participants maintain the visual illusion that they are full body avatars in an alternate version of reality. The teacher is able to walk up to a floating model of the solar system and use her controllers to adjust the position of the moon to explain the difference between a solar eclipse and a lunar eclipse. Students are able to walk around and see the simulation together from different points of view.

Although the invention has been described in detail in the foregoing embodiments for the purpose of illustration, it is to be understood that such detail is solely for that purpose and that variations can be made therein by those skilled in the art without departing from the spirit and scope of the invention except as it may be described by the following claims.

The invention claimed is:

1. A system for reconstructing a VR avatar with full body pose from a participant comprising:
    an inside-out tracked HMD that is to be worn by the participant;
    a left-hand controller to be held by a left hand of the participant that produces position data of the left hand of the participant;
    a right-hand controller to be held by a right hand of the participant that produces position data of the right hand of the participant;
    a right tracker worn on a right foot or right ankle of the participant;
    a left tracker worn on a left foot or left ankle of the participant;
    a communication network in communication with the left-hand controller and the right-hand controller and the right tracker and the left tracker and the motion capture suit and the motion capture unit; and
    a server computer in communication with the network that constructs a full body pose of the participant using real time data from only the right-hand controller and left-hand controller and right tracker and left tracker and HMD and from previously stored data about motion of the participant, the right tracker has a 6° of freedom IMU to produce tracked data from the right foot and a wireless transmitter which transmits the tracked data to the server computer through the communications network, the 6° of freedom are 3° of orientation and 3° of acceleration in an X, Y, Z coordinate system, and the left tracker has an imu, the right tracker has a microprocessor in communication with the wireless transmitter and the IMU, the microprocessor processes the tracked data and sends the tracked data that has been processed to the server computer through the wireless transmitter, the right tracker has a foot pressure tracking insole that is worn underneath the right foot, the foot pressure tracking insole produces pressure data which is provided to the microprocessor, and the left tracker has a foot pressure tracking insole that is worn underneath the left foot. the right tracker includes a proximity sensor which measures time-varying distance between the right foot and a floor upon which the participant is walking, the server computer receives input that includes position and orientation of each of the HMD, the left-hand controller and the right hand controller, gyroscopic orientation and accelerometer data from the IMU of the right tracker and left tracker, and six pressure values of the right foot and the left foot from the foot pressure tracking insole of the right tracker and the left tracker, the server computer receives a total number of input scalar values of 42, where six scalar values are for the position and orientation of the HMD and for each of the right-hand controller and the left-hand controller, six from each of the IMU of the right tracker and left tracker, and six for each of the foot pressure tracking insole of the right tracker and the left tracker, the server computer produces a body pose output of the participant from the 42 input scalar values.

2. The system of claim 1 wherein the server computer produces a total number of 48 output scalar values, where six scalar values for the position and orientation of each of the head, hands, feet, upper torso and pelvis, +2 scalar values for each of a right shoulder and left shoulder, +1 scalar value for each of the right elbow, left elbow, right knee and left knee of the participant, the computer produces a body pose output of the participant from the 48 scalar values.

3. The system of claim 2 wherein the body pose output of the participant includes position and orientation of the right hand and left hand, right foot and left foot, upper torso, pelvis, head, forward and upward rotation of each shoulder about the upper torso and inward to outward turning of elbows and knees of the participant.

4. The system of claim 3 including a motion capture suit to be worn by the participant; and
    a motion capture unit which captures motion of the participant from the motion capture suit worn by the participant, the server computer in communication with the network that constructs the full body pose of the participant using real time data from only the right-hand controller and left-hand controller and right tracker and left tracker and HMD and from previously stored data from the motion capture unit.

* * * * *